(12) United States Patent
Minami et al.

(10) Patent No.: US 7,698,413 B1
(45) Date of Patent: Apr. 13, 2010

(54) METHOD AND APPARATUS FOR ACCESSING AND MAINTAINING SOCKET CONTROL INFORMATION FOR HIGH SPEED NETWORK CONNECTIONS

(75) Inventors: John S. Minami, Honolulu, HI (US); Robin Y. Uyeshiro, Kailua, HI (US); Thien E. Ooi, Honolulu, HI (US); Murray Wallace, Honolulu, HI (US)

(73) Assignee: NVIDIA Corporation, Santa Clara, CA (US)

(*) Notice: Subject to any disclaimer, the term of this patent is extended or adjusted under 35 U.S.C. 154(b) by 1406 days.

(21) Appl. No.: 10/822,896

(22) Filed: Apr. 12, 2004

(51) Int. Cl.
*G06F 15/173* (2006.01)

(52) U.S. Cl. .............. 709/224; 709/227; 709/228; 709/250; 370/463

(58) Field of Classification Search .......... 709/224, 709/227, 228, 250
See application file for complete search history.

(56) References Cited

U.S. PATENT DOCUMENTS

| | | |
|---|---|---|
| 212,889 A | 3/1879 | Bridenthal, Jr. et al. |
| 4,807,111 A | 2/1989 | Cohen et al. .............. 364/200 |
| 4,839,851 A | 6/1989 | Maki ......................... 364/900 |
| 5,012,489 A | 4/1991 | Burton et al. ................ 375/8 |
| 5,056,058 A | 10/1991 | Hirata et al. ............. 364/900 |
| 5,161,193 A | 11/1992 | Lampson et al. ........... 380/49 |
| 5,163,131 A | 11/1992 | Row et al. ................. 395/200 |
| 5,307,413 A | 4/1994 | Denzer ....................... 380/49 |
| 5,426,694 A | 6/1995 | Hebert ...................... 379/242 |
| 5,430,727 A | 7/1995 | Callon ................... 370/85.13 |
| 5,440,551 A | 8/1995 | Suzuki ........................ 370/60 |
| 5,455,599 A | 10/1995 | Cabral et al. ............. 345/133 |
| 5,485,460 A | 1/1996 | Schrier et al. ........... 370/94.1 |
| 5,495,480 A | 2/1996 | Yoshida ...................... 370/60 |
| 5,499,353 A | 3/1996 | Kadlec et al. ............. 395/445 |
| 5,513,324 A | 4/1996 | Dolin, Jr. et al. ....... 395/200.18 |
| 5,519,704 A | 5/1996 | Farinacci et al. ........ 370/85.13 |
| 5,544,357 A | 8/1996 | Huei ......................... 395/600 |

(Continued)

FOREIGN PATENT DOCUMENTS

AU  4595297  5/1998

(Continued)

OTHER PUBLICATIONS

Muller, Raimund, LON-das universelle Netzwerk Elektronik 22-1991.

(Continued)

*Primary Examiner*—Hassan Phillips
*Assistant Examiner*—Glenford Madamba
(74) *Attorney, Agent, or Firm*—Zilka-Kotab, PC

(57) ABSTRACT

A method for accessing and maintaining socket control information for high speed network connections. A multi-port control block (CB) cache contains socket control information in CB entries for sockets assigned to the transport offload engine (TOE) by a host computer. Each port provides a TOE client direct access to the CB cache. Time critical logic are each provided dedicated ports to enable higher bandwidth accesses to the CB cache for these time critical clients. All other non-time critical TOE clients are given arbitrated access via a separate dedicated port. An optional external memory is given direct access to the CB cache via a dedicated port and can store more CB entries for additional sockets.

23 Claims, 8 Drawing Sheets

U.S. PATENT DOCUMENTS

| | | | |
|---|---|---|---|
| 5,546,453 A | 8/1996 | Hebert | 379/242 |
| 5,566,170 A | 10/1996 | Bakke et al. | 370/60 |
| 5,577,105 A | 11/1996 | Baum et al. | 379/93 |
| 5,577,172 A | 11/1996 | Vatland et al. | 395/114 |
| 5,577,237 A | 11/1996 | Lin | 395/555 |
| 5,581,686 A | 12/1996 | Koppolu et al. | 395/340 |
| 5,596,702 A | 1/1997 | Stucka et al. | 395/340 |
| 5,598,410 A | 1/1997 | Stone | 370/469 |
| 5,619,650 A | 4/1997 | Bach et al. | 395/200.01 |
| 5,621,434 A | 4/1997 | Marsh | 345/145 |
| 5,625,678 A | 4/1997 | Blomfield-Brown | 379/93 |
| 5,625,825 A | 4/1997 | Rostoker et al. | 395/730 |
| 5,634,015 A | 5/1997 | Chang et al. | 395/309 |
| 5,636,371 A | 6/1997 | Yu | 395/500 |
| 5,640,394 A | 6/1997 | Schrier et al. | 370/389 |
| 5,650,941 A | 7/1997 | Coelho et al. | 364/514 |
| 5,663,951 A | 9/1997 | Danneels et al. | 370/230 |
| 5,664,162 A | 9/1997 | Dye | 345/521 |
| 5,666,362 A | 9/1997 | Chen et al. | 370/420 |
| 5,675,507 A | 10/1997 | Bobo, II | 364/514 |
| 5,678,060 A | 10/1997 | Yokoyama et al. | 395/831 |
| 5,680,605 A | 10/1997 | Torres | 395/603 |
| 5,687,314 A | 11/1997 | Osman et al. | 395/200 |
| 5,696,899 A | 12/1997 | Kalwitz | 395/200.1 |
| 5,699,350 A | 12/1997 | Kraslavsky | 370/254 |
| 5,701,316 A | 12/1997 | Alferness et al. | 371/53 |
| 5,727,149 A | 3/1998 | Hirata et al. | 395/200.8 |
| 5,734,852 A | 3/1998 | Zias et al. | 395/334 |
| 5,734,865 A | 3/1998 | Yu | 395/500 |
| 5,748,905 A | 5/1998 | Hauser et al. | 395/200.79 |
| 5,754,540 A | 5/1998 | Liu et al. | 370/315 |
| 5,754,556 A | 5/1998 | Ramseyer et al. | 371/10.3 |
| 5,761,281 A | 6/1998 | Baum et al. | 379/93.29 |
| 5,778,178 A | 7/1998 | Arunachalam | 395/200.33 |
| 5,790,546 A | 8/1998 | Dobbins et al. | 370/400 |
| 5,790,676 A | 8/1998 | Ganesan et al. | 380/23 |
| 5,802,287 A | 9/1998 | Rostoker et al. | 395/200.8 |
| 5,802,306 A | 9/1998 | Hunt | 395/200.58 |
| 5,805,816 A | 9/1998 | Picazo, Jr. et al. | 395/200.53 |
| 5,809,235 A | 9/1998 | Sharma et al. | 395/200.6 |
| 5,815,516 A | 9/1998 | Aaker et al. | 371/53 |
| 5,818,935 A | 10/1998 | Maa | 380/20 |
| 5,826,032 A | 10/1998 | Finn et al. | 395/200.66 |
| 5,854,750 A | 12/1998 | Phillips et al. | 364/478.04 |
| 5,870,549 A | 2/1999 | Bobo, II | 395/200.36 |
| 5,870,622 A | 2/1999 | Gulick et al. | 395/800.35 |
| 5,872,919 A | 2/1999 | Wakeland | 395/200.6 |
| 5,877,764 A | 3/1999 | Feitelson et al. | 345/347 |
| 5,894,557 A | 4/1999 | Bade et al. | 395/200.58 |
| 5,909,546 A | 6/1999 | Osborne | 395/200.42 |
| 5,918,051 A | 6/1999 | Savitzky et al. | 395/683 |
| 5,920,732 A | 7/1999 | Riddle | 395/876 |
| 5,923,892 A | 7/1999 | Levy | 395/800.31 |
| 5,935,268 A | 8/1999 | Weaver | 714/758 |
| 5,937,169 A | 8/1999 | Connery et al. | 395/200.8 |
| 5,941,988 A | 8/1999 | Bhagwat et al. | 713/201 |
| 5,943,481 A | 8/1999 | Wakeland | 395/200.6 |
| 5,946,487 A | 8/1999 | Dangelo | 395/705 |
| 5,966,534 A | 10/1999 | Cooke et al. | 395/705 |
| 5,968,161 A | 10/1999 | Southgate | 712/37 |
| 5,974,518 A | 10/1999 | Nogradi | 711/173 |
| 5,991,299 A | 11/1999 | Radogna et al. | 370/392 |
| 5,999,974 A | 12/1999 | Ratcliff et al. | 709/224 |
| 6,014,699 A | 1/2000 | Ratcliff et al. | 709/224 |
| 6,034,963 A | 3/2000 | Minami et al. | 370/401 |
| 6,046,980 A | 4/2000 | Packer | 370/230 |
| 6,049,857 A | 4/2000 | Watkins | 711/207 |
| 6,061,368 A | 5/2000 | Hitzelberger | 370/537 |
| 6,061,742 A | 5/2000 | Stewart et al. | 709/250 |
| 6,076,115 A | 6/2000 | Sambamurthy et al. | 709/250 |
| 6,078,736 A | 6/2000 | Guccione | 395/500.17 |
| 6,081,846 A | 6/2000 | Hyder et al. | 709/250 |
| 6,092,110 A | 7/2000 | Maria et al. | 709/225 |
| 6,092,229 A | 7/2000 | Boyle et al. | 714/748 |
| 6,098,188 A | 8/2000 | Kalmanek, Jr. et al. | 714/746 |
| 6,101,543 A | 8/2000 | Alden et al. | 709/229 |
| 6,122,670 A | 9/2000 | Bennett et al. | 709/236 |
| 6,151,625 A | 11/2000 | Swales et al. | 709/218 |
| 6,157,955 A | 12/2000 | Narad et al. | 709/228 |
| 6,172,980 B1 | 1/2001 | Flanders et al. | 370/401 |
| 6,172,990 B1 | 1/2001 | Deb et al. | 370/474 |
| 6,173,333 B1 | 1/2001 | Jolitz et al. | 709/240 |
| 6,182,228 B1 | 1/2001 | Boden | 713/201 |
| 6,185,619 B1 | 2/2001 | Joffe et al. | 709/229 |
| 6,208,651 B1 | 3/2001 | Van Renesse et al. | 370/392 |
| 6,226,680 B1 | 5/2001 | Boucher | 709/230 |
| 6,230,193 B1 | 5/2001 | Arunkumar et al. | 709/218 |
| 6,233,626 B1 | 5/2001 | Swales et al. | 710/11 |
| 6,247,060 B1 | 6/2001 | Boucher | 709/238 |
| 6,247,068 B1 | 6/2001 | Kyle | 709/328 |
| 6,327,625 B1 | 12/2001 | Wang et al. | 709/235 |
| 6,330,659 B1 | 12/2001 | Poff et al. | 712/34 |
| 6,334,153 B2 | 12/2001 | Boucher | 709/230 |
| 6,341,129 B1 | 1/2002 | Schroeder et al. | 370/354 |
| 6,345,301 B1 | 2/2002 | Burns et al. | 709/230 |
| 6,347,347 B1 | 2/2002 | Brown et al. | 710/23 |
| 6,389,479 B1 | 5/2002 | Boucher et al. | 709/243 |
| 6,389,537 B1 | 5/2002 | Davis et al. | 713/187 |
| 6,393,487 B2 | 5/2002 | Boucher et al. | 709/238 |
| 6,397,316 B2 | 5/2002 | Fesas, Jr. | 711/200 |
| 6,427,169 B1 | 7/2002 | Elzur | 709/224 |
| 6,427,171 B1 | 7/2002 | Craft | 709/230 |
| 6,427,173 B1 | 7/2002 | Boucher | 709/238 |
| 6,430,628 B1 | 8/2002 | Connor | 710/5 |
| 6,434,620 B1 | 8/2002 | Boucher et al. | 709/230 |
| 6,460,080 B1 | 10/2002 | Shah et al. | 709/224 |
| 6,470,415 B1 | 10/2002 | Starr | 711/104 |
| 6,530,061 B1 | 3/2003 | Labatte | 714/807 |
| 6,591,302 B2 | 7/2003 | Boucher | 709/230 |
| 6,609,225 B1 | 8/2003 | Ng | 714/781 |
| 6,629,141 B2 | 9/2003 | Elzur et al. | 709/224 |
| 6,658,480 B2 | 12/2003 | Boucher | 709/239 |
| 6,687,758 B2 | 2/2004 | Craft | 709/250 |
| 6,697,868 B2 | 2/2004 | Craft | 709/230 |
| 6,751,665 B2 | 6/2004 | Philbrick | 709/224 |
| 6,757,746 B2 | 6/2004 | Boucher | 709/250 |
| 6,807,581 B1 | 10/2004 | Starr | 709/250 |
| 6,938,092 B2 | 8/2005 | Burns | 709/230 |
| 6,941,386 B2 | 9/2005 | Craft | 709/250 |
| 6,965,941 B2 | 11/2005 | Boucher | 709/230 |
| 6,996,070 B2 | 2/2006 | Starr | 370/252 |
| 7,042,898 B2 | 5/2006 | Blightman | 370/463 |
| 2001/0021949 A1 | 9/2001 | Blightman et al. | 709/219 |
| 2001/0023460 A1 | 9/2001 | Boucher et al. | 709/250 |
| 2001/0027496 A1 | 10/2001 | Boucher et al. | 709/250 |
| 2001/0036196 A1 | 11/2001 | Brightman | 370/465 |
| 2001/0037397 A1 | 11/2001 | Boucher | 709/230 |
| 2001/0037406 A1 | 11/2001 | Philbrick | 709/250 |
| 2001/0047433 A1 | 11/2001 | Boucher et al. | 709/250 |
| 2002/0055993 A1 | 5/2002 | Shah et al. | 709/223 |
| 2002/0085562 A1 | 7/2002 | Hufferd et al. | 370/392 |
| 2002/0087732 A1 | 7/2002 | Boucher et al. | 709/250 |
| 2002/0091844 A1 | 7/2002 | Craft | 709/230 |
| 2002/0095519 A1 | 7/2002 | Philbrick et al. | 709/250 |
| 2002/0120899 A1 | 8/2002 | Gahan et al. | 714/748 |
| 2002/0147839 A1 | 10/2002 | Boucher et al. | 709/238 |
| 2002/0156927 A1* | 10/2002 | Boucher et al. | 709/250 |
| 2002/0161919 A1 | 10/2002 | Boucher | 709/238 |
| 2002/0163888 A1 | 11/2002 | Grinfeld | 370/235 |
| 2002/0165992 A1* | 11/2002 | Banerjee | 709/315 |
| 2003/0005142 A1 | 1/2003 | Elzur et al. | 709/232 |
| 2003/0005143 A1 | 1/2003 | Elzur et al. | 709/232 |
| 2003/0014544 A1 | 1/2003 | Pettey | 709/249 |
| 2003/0016669 A1 | 1/2003 | Pfister et al. | 370/392 |

| | | | | |
|---|---|---|---|---|
| 2003/0031172 A1 | 2/2003 | Grinfeld ................. 370/389 | WO | WO 03/021447    3/2003 |
| 2003/0046330 A1 | 3/2003 | Hayes .................... 709/201 | WO | WO 03/021452    3/2003 |
| 2003/0046418 A1 | 3/2003 | Raval et al. ............. 709/237 | | |
| 2003/0056009 A1 | 3/2003 | Mizrachi et al. ......... 709/245 | | |
| 2003/0058870 A1 | 3/2003 | Mizrachi et al. ...... 370/395.52 | | |
| 2003/0061505 A1 | 3/2003 | Sperry et al. ............ 713/200 | | |
| 2003/0066011 A1 | 4/2003 | Oren ...................... 714/758 | | |
| 2003/0079033 A1 | 4/2003 | Craft ....................... 709/230 | | |
| 2003/0084185 A1 | 5/2003 | Pinkerton ............... 709/236 | | |
| 2003/0095567 A1 | 5/2003 | Lo et al. ................. 370/466 | | |
| 2003/0115350 A1 | 6/2003 | Uzrad-Nali et al. ...... 709/231 | | |
| 2003/0115417 A1 | 6/2003 | Corrigan ................. 711/118 | | |
| 2003/0128704 A1 | 7/2003 | Mizrachi et al. ......... 370/394 | | |
| 2003/0140124 A1 | 7/2003 | Burns ..................... 709/220 | | |
| 2003/0145101 A1 | 7/2003 | Mitchell et al. ......... 709/236 | | |
| 2003/0145270 A1 | 7/2003 | Holt ....................... 714/766 | | |
| 2003/0167346 A1 | 9/2003 | Craft et al. .............. 709/250 | | |
| 2003/0200284 A1 | 10/2003 | Philbrick et al. ......... 709/219 | | |
| 2004/0003126 A1 | 1/2004 | Boucher ................. 709/250 | | |
| 2004/0054813 A1 | 3/2004 | Boucher ................. 709/250 | | |
| 2004/0062245 A1 | 4/2004 | Sharp ..................... 370/392 | | |
| 2004/0062246 A1 | 4/2004 | Boucher ................. 370/392 | | |
| 2004/0064578 A1 | 4/2004 | Boucher ................. 709/236 | | |
| 2004/0064589 A1 | 4/2004 | Boucher ................. 709/250 | | |
| 2004/0064590 A1 | 4/2004 | Starr ....................... 709/250 | | |
| 2004/0073703 A1 | 4/2004 | Boucher ................. 709/245 | | |
| 2004/0078462 A1 | 4/2004 | Philbrick ................ 709/224 | | |
| 2004/0088262 A1 | 5/2004 | Boucher ................... 705/65 | | |
| 2004/0100952 A1 | 5/2004 | Boucher ................. 370/389 | | |
| 2004/0111535 A1 | 6/2004 | Boucher ................. 709/250 | | |
| 2004/0117509 A1 | 6/2004 | Craft ....................... 709/250 | | |
| 2004/0158640 A1 | 8/2004 | Philbrick ................ 709/230 | | |
| 2004/0158793 A1 | 8/2004 | Blightman ............... 714/758 | | |
| 2004/0240435 A1 | 12/2004 | Boucher ................. 370/352 | | |
| 2005/0066028 A1* | 3/2005 | Illikkal et al. ............ 709/224 | | |
| 2005/0122986 A1 | 6/2005 | Starr ....................... 370/412 | | |
| 2005/0141561 A1 | 6/2005 | Craft ....................... 370/474 | | |
| 2005/0160139 A1 | 7/2005 | Boucher ................. 709/203 | | |
| 2005/0175003 A1 | 8/2005 | Craft ....................... 370/389 | | |
| 2005/0182841 A1 | 8/2005 | Starr ....................... 709/228 | | |
| 2005/0198198 A1 | 9/2005 | Craft ....................... 709/217 | | |
| 2005/0204058 A1 | 9/2005 | Philbrick ................ 709/238 | | |
| 2005/0278459 A1 | 12/2005 | Boucher ................. 709/250 | | |
| 2006/0010238 A1 | 1/2006 | Craft ....................... 709/227 | | |
| 2007/0062245 A1 | 3/2007 | Fuller et al. ............... 72/413 | | |

FOREIGN PATENT DOCUMENTS

| | | |
|---|---|---|
| AU | 7364898 | 11/1998 |
| AU | 4435999 | 12/1999 |
| AU | 723724 | 9/2000 |
| AU | 0070603 | 3/2001 |
| AU | 734115 | 6/2001 |
| AU | 0741089 | 11/2001 |
| AU | 0228874 | 5/2002 |
| CA | 2265692AA | 5/1998 |
| CA | 2287413AA | 11/1998 |
| CA | 2328829AA | 12/1999 |
| CA | 2265692 C | 8/2001 |
| CN | 1237295 A | 12/1999 |
| CN | 1266512 T | 9/2000 |
| CN | 1305681 T | 7/2001 |
| TW | 447205 B | 7/2001 |
| TW | 448407 B | 8/2001 |
| WO | WO98/21655 | 5/1998 |
| WO | WO 98/50852 | 11/1998 |
| WO | WO 99/65219 | 12/1999 |
| WO | WO 01/13583 | 2/2001 |
| WO | WO 01/28179 | 4/2001 |
| WO | WO 02/39302 | 5/2002 |
| WO | WO 02/059757 | 8/2002 |
| WO | WO 02/086674 | 10/2002 |
| WO | WO 03/021443 | 3/2003 |

OTHER PUBLICATIONS

Abbot, Mark B.; Peterson, Larry L., "Increasing Network Trhoguhput by Integrating Protocol Layers", IEEE 1993.
Wright, Maury, Low-Cost Control LANs Add Automation to Homes, Autos, and Offices EDN-Technology Jul. 20, 1992.
Preston, David J., "Internet Protocols Migrate to Silicon for Networking Devices" Electronic Design Apr. 14, 1997.
Chesson, Greg, "The Protocol Engine Project" Technology Focus Sep. 1987.
Chesson, Greg, "Proceedings of the Summer 1987 USENIX Conference" USENIX Association Jun. 8-12, 1987.
G. Chesson and L. Green, "XTP Protocol Engine VLSI for Real-Time LANS" EFOC/LAN Jun. 29-Jul. 1, 1968.
Wayner, "Sun Gambles on Java Chops", Bytes, Nov. 1996.
Raz, "Real Time Program Language Accelerator", WO 98/21655, May 1998.
Agrawal et al. "Architecture and Design of the Mars Hardware Accelerator", ACM 1987, pp. 101-107.
Case, "Implementing the Java Virtual Machine", Microprocessor Report, Mar. 1996.
Kitadeya et al., "Matsushita Launches Web TV Internet Connection Terminal", http://www.mei.co.jp/corp/news/official.data/data.dir/en981112-1/en981112-1.html, Nov. 1998.
iReady Product Data Sheet, Internet Tuner.
Johnson et al. , "Internet Tuner", New Media News, http://www.newmedianews.com/020197/ts.sub-inettuner.html, Jan. 1997.
Kelly, T., "Cheap Internet Hardware that Fits in Everything", ZDNet, http://www.zdnet.co.uk/news/1998/44/ns-5998.html, Nov. 1998.
8802-3:2000 ISO/IEC Information Technology, http://www.computer.org/cspress/CATALOG/st01118.htm.
INCITS: Development work conducted in t10-I/O Interface-Lower Level Sep. 30, 2002 Weber, Ralph O.
Stevens, Richard W., "TCP/IP Illustrated Volume" Addison-Wesley Professional Computing Series.
Abbot, Mark B., and Peterson, Larry L., "Increasing Network Throughput by Integrating Protocol Layers" IEEE 1993.
Wright, Maury, "Low-Cost Control LANs Add Automation to Homes, Autos, and Offices" EDN Jul. 20, 1992.
Preston, David J., "Internet Protocols Migrate to Silicon for Networking Devices" Electronic Design Apr. 14, 1997.
Muller, Raimund, "LON—das universelle Netzwerk" Electronik 22/1991.
Rang, Michael; Tantawy, Ahmed, "A Design Methodology for Protocol Processors" IEEE 1995.
Banks, David and Prudence, Michael, "A High-Performance Network Architecture for a PA-RISC Workstation" IEEE Journal vol. II, No. 22 Feb. 1993.
Steenkiste, Peter, "A High-Speed Network Interface for Distributed-Memory Systems: Architecture and Applications" ACM Transactions on Computer Systems, vol. 15, No. 1 Feb. 1997.
Doumenis, Gr.A., Konstantoulakis, G.E., Reisis, D.I.and Stassinopoulos, G.I. "A Personal Computer Hosted Terminal Adapter For The Broadband Integrated Services Digital Network and Applications" National Technical University of Athens, Greece.
Womack, Lucas; Mraz, Ronald; Mendelson, Abraham, "A Study of Virtual Memory MTU Reassembly withing the PowerPC Architecture" IEEE 1997.
Steenkiste, Peter, "A Systematic Approach to Host Interface Design for High-Speed Networks" IEEE Mar. 1994.
Wittie, Larry D., Ma, Fanyuan, "A TCP/IP Communication Subsystem in Micros" IEEE 1987.
Dalton, Chris; Watson, Greg; Banks, David; Calamvokis, Costas; Edwards, Aled; Lumley, John, "Afterburner: A Network-independent card provides architectural support for high-performance protocols" IEEE Jul. 1993.
Gupta, Pankaj; McKeown, Nick, "Algorithms for Packet Classification" IEEE Network Mar./Apr. 2001.
Clark, David D.; Romkey, John; Salwen, Howard, "An Analysis of TCP Processing Overhead" IEEE 1988.

Clark, David D.; Jacobson, Van; Romkey, John; Salwen, Howard, "An Analysis of TCP Processing Overhead" IEEE Jun. 1989.
Goloi, W.K.; Behr, P. "An IPC Protocol and Its Hardware Realization for a High-Speed Distributed Multicomputer System" IEEE 1981.
Ames, Richard, "Building an Embedded Web Server from Scratch" Circuit Cellar Ink Feb. 1998.
Legg, John, "Choosing and implementing an embedded TCP/IP Stack" Electronic Product Design Jan. 1999.
Orphanos, George; Birbas, Alexios; Petrellis, Nikos; Mountzouris, Ioannis; Malataras, Andreas, "Compensating for Moderate Effective Throughput at the Desktop" IEEE Communication Magazine Apr. 2000.
Yocum, Kenneth G.; Chase, Jeffrey S.; Gallatin, Andrew J.; Lebeck, Alvin R., Cut-Through Delivery in Trapeze: An Exercise in Low-Latency Messaging IEEE 1997.
Varada, S.; Yang, Y.; Evans, D., "Data and Buffer Management in ATM Systems" TranSwitch Corporation.
Bonjour, Dominique; de Hauteclocque, Gaelle; le Moal, Jacques, "Design and Application of ATM LAN/WAN Adapters" IEEE 1998.
Kim, Chan; Jun, Jong-Jun; Park, Yeong-Ho; Lee, Kyu-Ho; Kim, Hyup-Jong, "Design and Implementation of a High-Speed ATM Host Interface Controller" Electronics and Telecommunications Research Institute, Korea.
Steenkiste, Peter, "Design, Implementation, and evaluation of a Single-copy Protocol Stack" Software—Practice and Experience, vol. 28, Jun. 1998.
Meleis, Hanafy E.; Serpanos, Dimitrios, N., "Designing Communication Subsystems for High-Speed Networks" IEEE Network Jul. 1992.
Doumenis, Gr. A.; Reisis, D.I.; Stassinopoulos, G.I., "Efficient Implementation of the SAR Sublayer and the ATM Layer in High-Speed Broadband ISDN Data Terminal Adapters" IEEE 1993.
Mora, F.; Sebastia, A., "Electronic Design of a High Performance Interfacce to the SCI Network" IEEE 1998.
Eady, Fred, "Embedded Internet Part 2: TCP/IP and a 16-Bit Compiler" Embedded PC Jun. 1999.
Shivam, Piyush; Wyckoff, Pete; Panda, Dhabaleswar, "EMP: Zero-copy OS-bypass NIC-driven Gigabit Ethernet" SC2001 Nov. 2001, Denver CO, USA.
Mansour, Mohammad; Kayssi, Ayman, " FPGA-Based Internet Protocol Version 6 Router" IEEE 1998.
Smith, Jonathon M.; Traw, C. Brendan S., "Giving Applications Access to Gb/s Networking" IEEE Network Jul. 1993.
Traw, C. Brendan S.; Smith, Jonathan M., "Hardware/Software Organization of a High-Performance ATM Host Interface" IEEE 1993.
Nagata, Takahiko; Hosoda, Yamashita, Hiroyuki, "High-Performance TCP/IP/ATM Communication Board" NTT Information and Communication Systems Laboratories 1998.
Nagata, Takahiko; Hosoda, Yasuhiro; Yamahsita, Hiroyuki, "High-Performance TCP/IP/ATM Communication Boards:Driving Force for Various Multimedia Services" vol. 9 No. 6 Nov. 1997.
Jolitz, William Frederick, "High-Speed Networking: Header prediction and forward-error correction for very high-speed data transfer" Dr. Dobbs Journal, Aug. 1992.
Chiswell, Dave "Implementation Challenges for 155Mbit ATM Adapters" ISBN# 0-7803-2636-9.
Wright, Maury "Intelligent Ethernet Boards" EDN Jun. 23, 1988.
Preston, David "Intetnet Protocols Migrate to Silicon for Networking Devices" Electronic Design Apr. 14, 1997.
Ivanov-Loshkanov, V.S.; Sevast'yanov, S.F., Semenov, M.N., "Network Microprocessor Adapter" Avtmatika i Vyshislitel'naya Tekhnika vol. 17 No. 5 pp. 25-28, 1983.
Druschel, Peter; Abbot, Mark B.; Pagels, Michael A.; Peterson, Larry L., "Network Subsystem Design" IEEE Network Jul. 1993.
Huange, Jau-Hsiung; Chen, Chi-Wen, "On Performance Measurments of TCP/IP and its Device Driver" IEEE 1992.
Siegel, Martin; Williams, Mark; Robler, Georg, "Overcoming Bottlenecks in High-Speed Transport Systems" IEEE 1991.
Neufeld, Gerald W.; Ito, Mabo Robert; Goldberg, Murray; McCutcheon, Mark J.; Ritchie, Stuart, "Paralleel Host Interface for an ATM Network" IEEE Network Jul. 1993.
Maly, K.; Khanna, K.; Kukkamala, R.; Overstreet C.M.; Yerraballi, R.; Foundriat, E.C.; Madan, B., "Parallel TCP/IP for Multiprocessor Workstations" High Performance Networking, IV, 1993 IFIP.
Laskman, T.V.; Madhow, U., "Performance Analysis of Window-based Flow Control using TCP/IP:Effect of High Bandwidth Delay Products and Random Loss" High Performance Networking V. 1994 IFIP.
Ramakrishnan, K.K., "Performance Considerations in Designing Network Interfaces" IEEE Journal1993.
Camarda, P.; Pipio, F.; Piscitelli, G.; "Performance evaluating of TCP/IP implementations in end systems" IEE Proc-Computer Digital Tech. vol. 146 No. 1 Jan. 1999.
Toyoshima, Kan; Shirakawa, Kazuhiro; Hayashi, Kazuhiro, "Programmable ATM Adapter: Rapid Prototyping of Cell Processing Equipment for ATM Network" IEEE 1997.
Blumrich, Matthias A.; Dubnicku, Cezary; Felton, Edward W.; Li, Kai, "Protected, User-level DMA for the SHRIMP Network Interface" IEEE 1996.
Feldmeier, David C.; McAuley, Anthony J.; Smith, Jonathan M., Bakin, Deborah S.; Marcus, William S.; Raleigh, Thomas M., "Protocol Boosters" IEEE 1998.
Marcus, William S.; Hadzic, Ilija; McAuley, Anthony J.; Smith, Jonathan M., "Protocol Boosters: Applying Programmability to Network Infrastructures" IEEE Communications Magazine Oct. 1998.
Korablum, Deborah F., "Protocol Implementation and Other Performance Issues for Local and Metropolitan Area Networks" EEE 1988.
Dittia, Zubin D.; Parulkar, Guru M.; Jr., Jerome R. Cox, "The APIC Approach to High Performance Network Interface Design: Protect4ed DMA and Other Techniques" IEEE 1997.
Rutsche, Erich, "The Architecture of a Gb/s Multimedia Protocol Adapter" ACM SIGCOMM Computer Communication Review.
Moldeklev, Kjersti; Klovning, Espen; Kure, Oivind, "The effect of end system hardware and software on TCP/IP throughput performance over a local ATM Network".
Kanakia, Hermant; Cheriton, David R., "The VMP Network Adapter Board (NAB) High Performance Network Communication for Multiprocessors" ACM 1988.
Chandrammenon, Grish P.; Varghese, George, "Trading Packet Headers for Packet Processing" IEEE 1996.
Nielson, Dr. Michael J.K., "TURBOchannel" IEEE 1991.
New Media News, www.newmedianews.com/02197/ts_inettuner.html.
Kelly, T. "Cheap Internet Hardware that Fits in Everything" ZDNet, www.zdnet.co.uk/news/1998/77/ns-5998.html.
Kitadeya et al. "Matsushita Launches WebTV Internet Connection Terminal" www.mei.co.jp/corp/news/official.data.dir/en981112-1/en981112-1html.
eady Product Data Sheet, Internet Tuner.
Luijten, Ronald P., "An OC-12 ATM Switch Adapter Chipset" 1998 IEEE.
"Less-Numerical Algorithms", Ch. 20 p. 888-895.
"Storage Networking Industry Association" iSCSI Building Blocks for IP Storage Networking, www.ipstorage.org.

* cited by examiner

MWTHOD AND APPARATUS FOR ACCESSING
AND MAINTAINING SOCKET CONTROL
INFORMATION FOR HIGH SPEED
NETWORK CONNECTIONS

FIELD OF THE INVENTION

The present invention generally relates to accessing and maintaining socket control information for high speed network connections. The invention relates more specifically to a method and apparatus for maintaining socket information using a multiple port cache memory and controller.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The packaging of data into data packets for network transfer and the reassembly of the data packets on the receiving end consumes a large amount of CPU cycles on a host computer system. As network bandwidth increases using higher speeds, such as the gigabit range, the workload on the host computer system increases. This causes the host computer system to spend more valuable CPU cycles managing network communications instead of executing application programs.

Transport control protocol (TCP) and Internet protocol (IP) are commonly used for packet network communications and are defined in Request for Comments (RFC) documents maintained by the Internet Engineering Task Force (IETF). TCP/IP or transport offload engines (TOE) are used to move TCP/IP processing from the operating system to a specialized processor, often located on a network interface card (NIC). Adding a TOE can dramatically increase throughput. A TOE takes the job of translating all or part of the TCP/IP protocol away from the host's main processor, thus freeing up the host computer system to run other applications.

TCP/IP utilizes socket connections. The host computer system must notify the TOE of the sockets that it wants the TOE to handle. The host computer system transfers socket control information to the TOE. Some TOEs store the socket control information in a data structure in memory local to the TOE. During socket processing, the TOE references the socket control information to manage the socket communications. However, as the transfer speed across the network increases, the socket control information must be accessed faster and more efficiently.

Based on the foregoing, there is a clear need for a system that provides for the management of socket control information for high-speed networks in a highly accessible manner. Additionally, there is a need for a system that would allow operations such as transmit and receive to reference socket control information at a higher priority than other operations.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Figure 1:
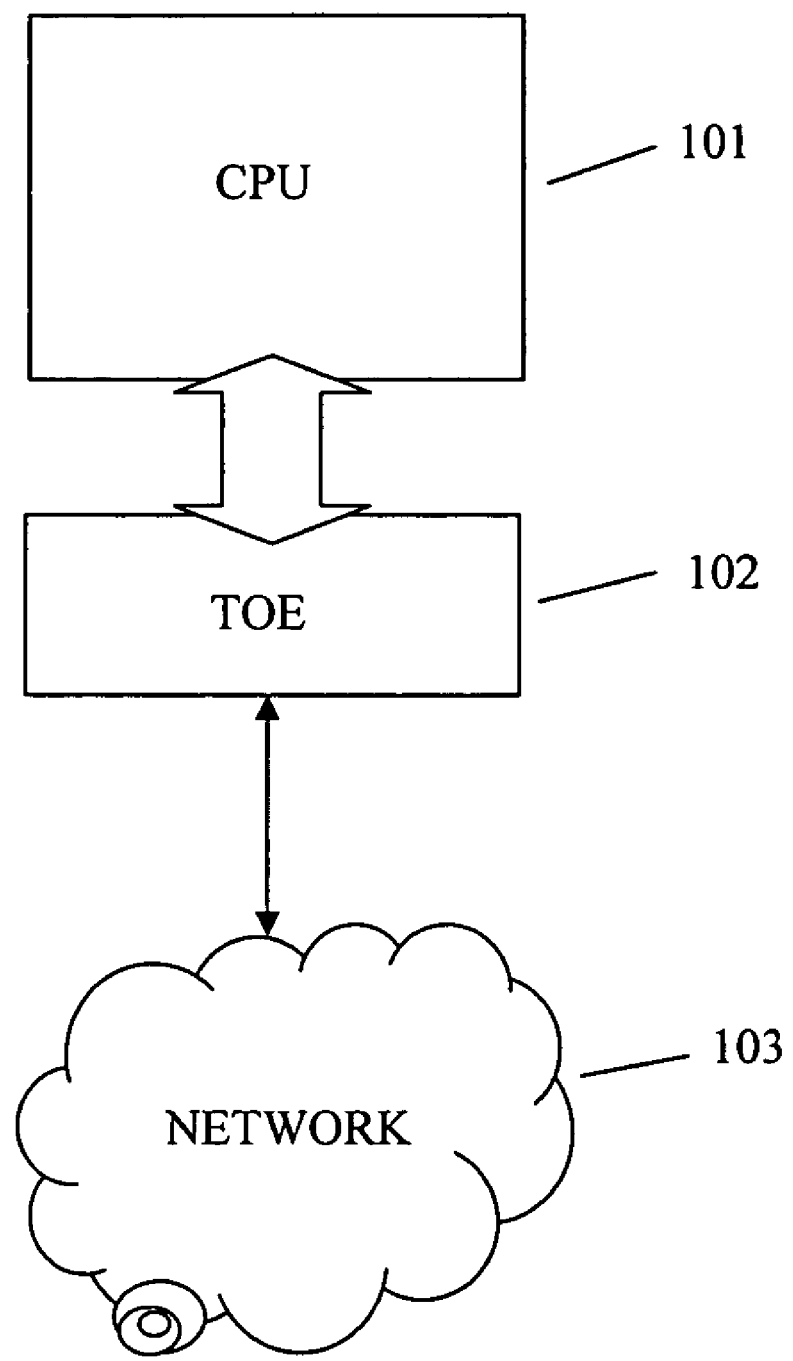
FIG. 1 is a block diagram that illustrates a CPU in communication with a transport offload engine (TOE) interfacing with an Ethernet network according to an embodiment of the invention.

A method and apparatus for accessing and maintaining socket control information for high-speed network connections is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Description
   2.1 Transport Offload Engine (TOE)
   2.2 Control Block (CB) Cache
   2.21 CB Cache Bandwidth
   2.22 CB Entry Lookup using Socket Hashes
   2.23 CB Entry Lookup using CB Handlers
   2.24 CB Cache Organization
3.0 Extensions and Alternatives 1.0 General Overview The needs identified in the foregoing Background, and other needs and objects that will become apparent for the following description, are achieved in the present invention, which comprises, in one aspect, a method for accessing and maintaining socket control information for high speed network connections.

A multi-port control block ("CB") cache contains socket control information in CB entries for sockets assigned to the TOE by a host computer. The socket control information is needed by the TOE to form transmit packets and check if receive packets are assigned to the TOE, for example.

Each port provides a TOE client direct access to the CB cache. Time critical TCP receiving (RX) and TCP transmitting (TX) logic are each provided dedicated ports to enable higher bandwidth accesses to the CB cache. All other non-time critical TOE clients are given arbitrated access via a separate dedicated port.

An optional external memory is given direct access to the CB cache via a dedicated port. The external memory can store more socket control information in CB entries for additional sockets. When the optional external memory is present, the CB cache keeps one CB entry empty to facilitate fast CB entry transfers between the external memory and the CB cache. The CB cache transfers a CB entry from the external memory before writing an older CB entry to the external memory, thus freeing up the older CB entry's slot in the CB cache.

When the optional external memory is not present, the same dedicated port mentioned above may be used by the host to directly transfer CB information to and from the CPU and the TOE.

Arbitration between clients that share a port on the CB Cache is based on a priority model where some clients are assigned a higher priority than other TOE clients. The priority scheme is based on how time-critical of each clients accesses to CB information is.

CB entries are located in the CB cache using two data structures: a hash reference table and a CB identifier (also referred to herein as a CB handle) reference table. The hash reference table is used by the RX logic when it is trying to find a CB entry associated with a received packet. The CB identifier reference table is used by all other TOE clients when the CB handle is already known.

An access locking mechanism is provided to ensure CB entry coherency. Access locks are requested per CB entry field, which allows multiple TOE clients to access the same CB entry simultaneously, but not just the same field within the CB entry. CB entry accesses may be of the locked or unlocked variety.

In addition, when external memory is present for additional CB entry storage, the CB Cache controller uses a least recently used (LRU) algorithm to determine which CB slot to write back to external memory when a new CB entry is read into the cache.

2.0 Structural and Functional Description 2.1 Transport Offload Engine (Toe)

FIG. 1 illustrates a host computer CPU 101 in communication with a TOE 102. The TOE 102 is communicably linked to a local area network (LAN) 103 such as an Ethernet network, or any other data link layer protocol. The TOE 102 can be located on the same circuit board or silicon as the host CPU 101, or on a network interface controller (NIC) board or card. The CPU 101 has its network communications offloaded by the TOE 102. The CPU 101 passes the TOE 102 the communication socket control information for the sockets that the CPU 101 wants the TOE 102 to handle.

The TOE 102 manages the sockets that the CPU 101 has assigned to the TOE 102 as network packets move between the network 103 and the CPU 101. The TOE 102 uses the socket control information to manage transmit and receive packets over the network 103. To be able to keep up with the high data transfer rates of the network 103, the TOE 102 manages the socket control information located in the TOE 102 using a multiple-port control block (CB) cache memory and controller. The multi-port CB cache memory and controller allow the TOE 102 to service transmit and receive packets at a rate that is more than adequate to keep up with transfer speeds of 10 Gb and above.

Figure 2:
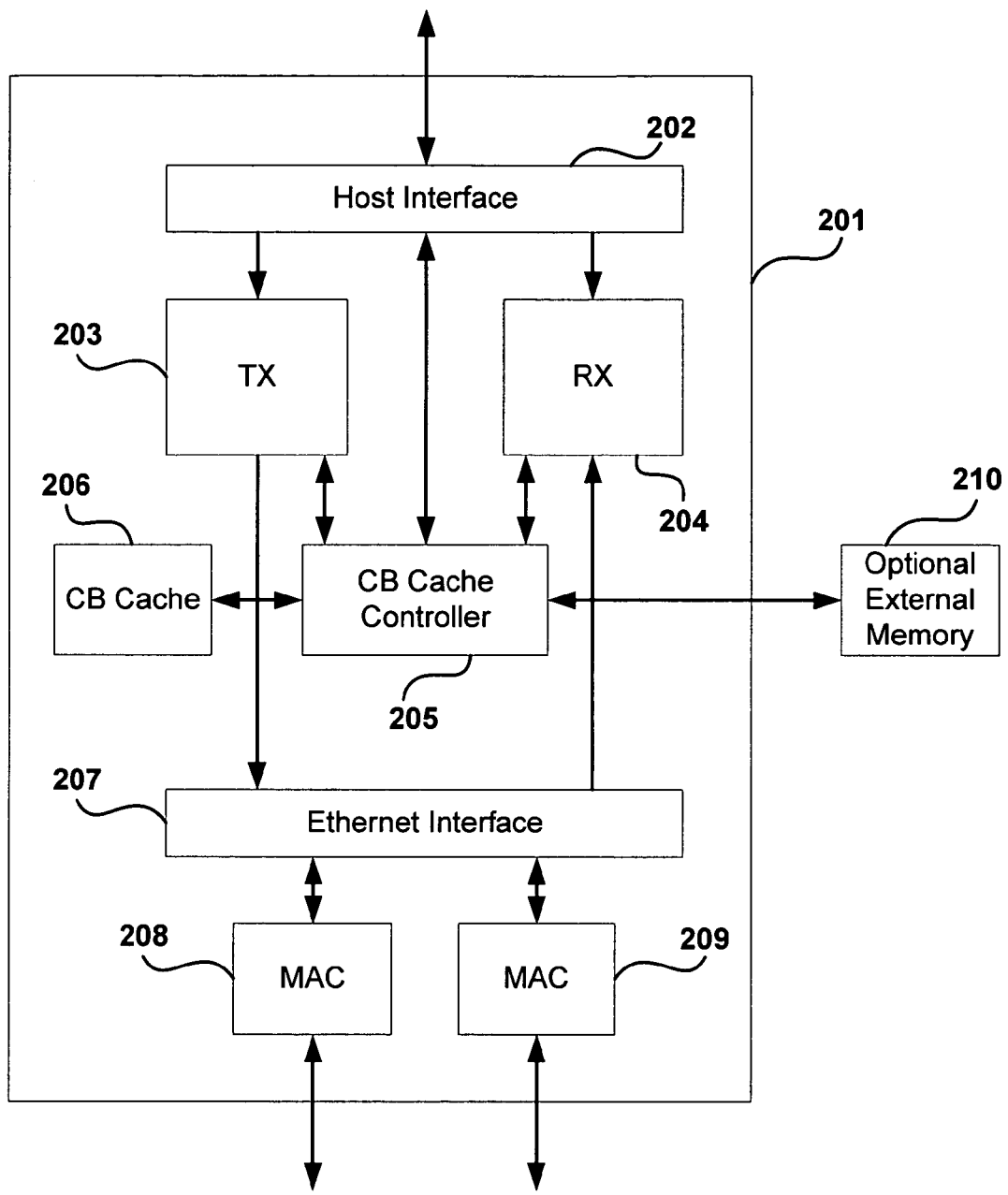
FIG. 2 is a block diagram that illustrates a TOE structure according to an embodiment of the invention.

FIG. 2 illustrates a high-level view of an embodiment of the invention incorporated into a TOE 201. The TOE 201 shown supports dual media access controllers (MACs) 208, 209. However, any number of MACs can be provided in alternative embodiments, and two is not limiting. Transmit and receive buffers can be incorporated between the MACs 208, 209 and an integrated network interface 207 to allow any type of MAC to be incorporated into the TOE 207.

A host interface 202 allows the TOE 201 to transfer data to and from a host CPU.

The main sections of the TOE 201 are the transmit (TX) 203 and receive (RX) 204 modules. The TX 203 module processes data packets sent by the host to the TOE over the host interface 202. The RX module 204 processes incoming data packets from the Ethernet interface 207.

The control block (CB) cache 206 contains socket control information for sockets that have been offloaded from the host CPU. The CB cache controller 205 allows multi-port access to the CB cache 206. Multiple ports enable an embodiment of the invention to provide access to the CB cache 206 at speeds sufficient to handle 10 Gb data rates and above.

A port on the CB cache is dedicated for communications with an optional external memory 210. This memory is used to store addition CB entries. When the external memory is not present, the port on the CB cache is used by the host to transfer CB entries to and from the host system and the TOE.

2.2 Control Block (CB) Cache

An embodiment of the invention uses a cache structure (CB cache 206) that works in conjunction with an optional external memory structure. The CB cache 206 is equipped with multiple ports to allow greater access bandwidth to resources that are time critical for processing network traffic. The CB cache 206 contains socket control information and, alternatively, can be used to store other data structures e.g., instruction block queues. This allows the entire TOE 201 to keep up with very high-speed network traffic (10 Gb and above).

Figure 3:
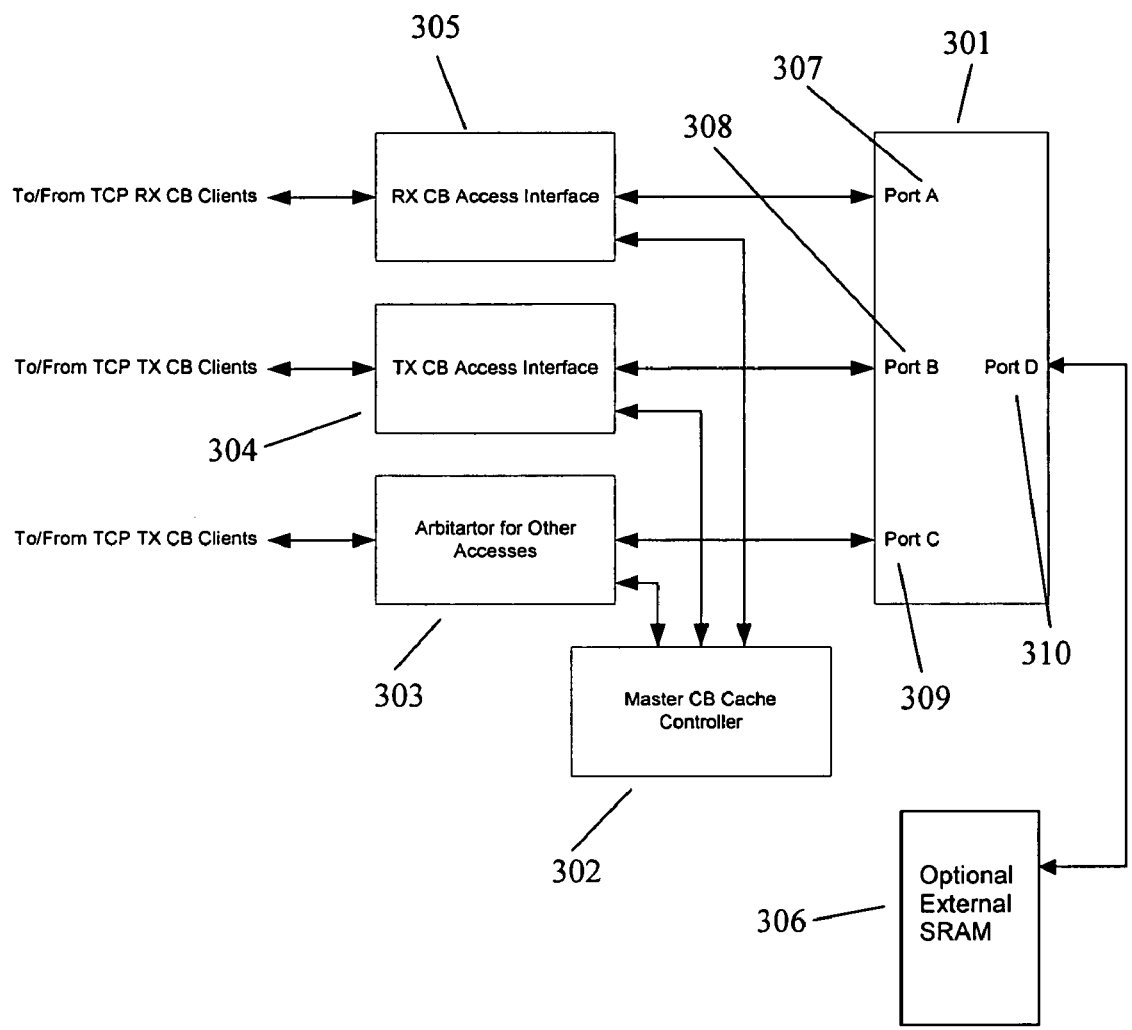
FIG. 3 is a block diagram that illustrates a multi-port cache structure with a cache controller arbitrating between multiple access interfaces according to an embodiment of the invention.

FIG. 3. illustrates an embodiment of the invention using a multi-port SRAM for the CB cache 301. Each CB entry in the CB cache 301 contains socket control information such as: the state of the socket, remote IP address and port, remote MAC address, operating status of the socket (sliding window, delayed ACK mode, etc.), sequence numbers, ACK numbers, etc. The socket control information is needed by the TOE to form transmit packets and check if receive packets are assigned to the TOE, for example. The socket control information in the CB cache 301 is updated by components (TOE clients) in the TOE that track the sockets and their status. TOE clients can be any component that operates within the TOE or any component that can externally access the TOE. The CB cache controller 302 is responsible for managing and arbitrating accesses to the CB cache 301.

The CB cache 301 is needed because the optional external SRAM 306 where the main CB memory is typically located is shared with other TOE data structures (SGLs, FIFOs, Queues, etc.). Therefore, in order to meet the access requirements needed to support 10 Gb network speeds, a fast access method is implemented that allows the different CB clients enough bandwidth to service both RX and TX packets. When the external SRAM 306 is not present, the CB cache 301 serves as the main CB memory.

In one embodiment, the CB cache 301 is implemented as a quad port, 512×64 bit, synchronous SRAM. This is enough memory to hold 16 CB entries with each entry being 256 bytes in length. In other embodiments, the CB cache 301 may have any other size appropriate for the application. The CB cache controller 302 accepts CB access requests from various resources, checks to see if the desired CB is in the cache, and if it is, arbitrates between all good requests for accesses to the CB cache 301. Time critical TCP RX and TCP TX accesses go through their own interfaces 305, 304 to enable higher bandwidth accesses to the CB cache 301. All other non-time critical TOE clients are arbitrated through a third interface 303.

Each interface has a dedicated port to speed accesses to the CB cache 301. The RX access interface 305 is communicably connected to port A 307, the TX access interface 304 is communicably connected to port B 308, and the arbitrator for other accesses 303 is communicably connected to port C 309. A fourth port, port D 310, is provided to allow the CB cache controller 302 to transfer data to and from the host (also a TOE client) or an optional external SRAM 306. This allows the CB cache controller to retrieve new CB entries or store old CB entries while simultaneously granting access to TOE clients to other CB entries within the CB Cache.

Access arbitration within each port is based on a predetermined priority model where some clients (e.g., the RX packet parser and TX packet generator modules) are assigned a higher priority than other TOE clients. The priority assigned to each client is determined by how time critical the TOE client's CB accesses are.

An external SRAM 306 may be added to expand the capabilities of the TOE. The external SRAM 306 can store more socket control information for additional sockets. An embodiment of the invention can detect the presence of the external SRAM 306 via a configuration resistor, detecting the external SRAM address lines, or other methods. If the external SRAM 306 is not present, then the CB cache 301 functions as the main CB memory.

2.21 CB Cache Bandwidth

The CB cache structure is designed to support dual 10 Gb Ethernet links. Therefore, the total bandwidth required for full duplex line speed is 40 Gb/second (10 Gb/sec×2 (Links)×2 (for TX and RX), or 5 GB/second. Assuming that an average packet requires 128 bytes, the total packet throughput is:

Packet Throughput=5 GB/128=39.1 M Packets/second

Further, assuming that 128 bytes are accessed per packet, the total CB access requirement is:

CB Access Requirement=(39.1 M Packets/second)×(128 Bytes/Packet)=5 GB/second

The requirement covers both TX and RX directions. Since they are given dedicated ports 307, 308 into the CB cache 301, each port in the cache requires a 2.5 GB/second bandwidth. The target operating frequency is 200 MHz and the bus width for the CB cache (to internal TOE clients) is 128 bits. Therefore, the theoretical bandwidth available to each of the TX and RX clients is:

Theoretical Bandwidth=(200 M×128 bits)/(8 bits/Byte) =3.2 GB/second

Therefore, the dedicated ports for TX 308 and RX 307 will provide enough bandwidth access to the CB cache to support dual 10 Gbps Ethernet links. In fact, the dedicated ports will support the links at line speed.

All other CB clients that are non-time critical will share another port 309 into the CB cache 301.

2.22 CB Entry Lookup Using Socket Hashes

Figure 4A:
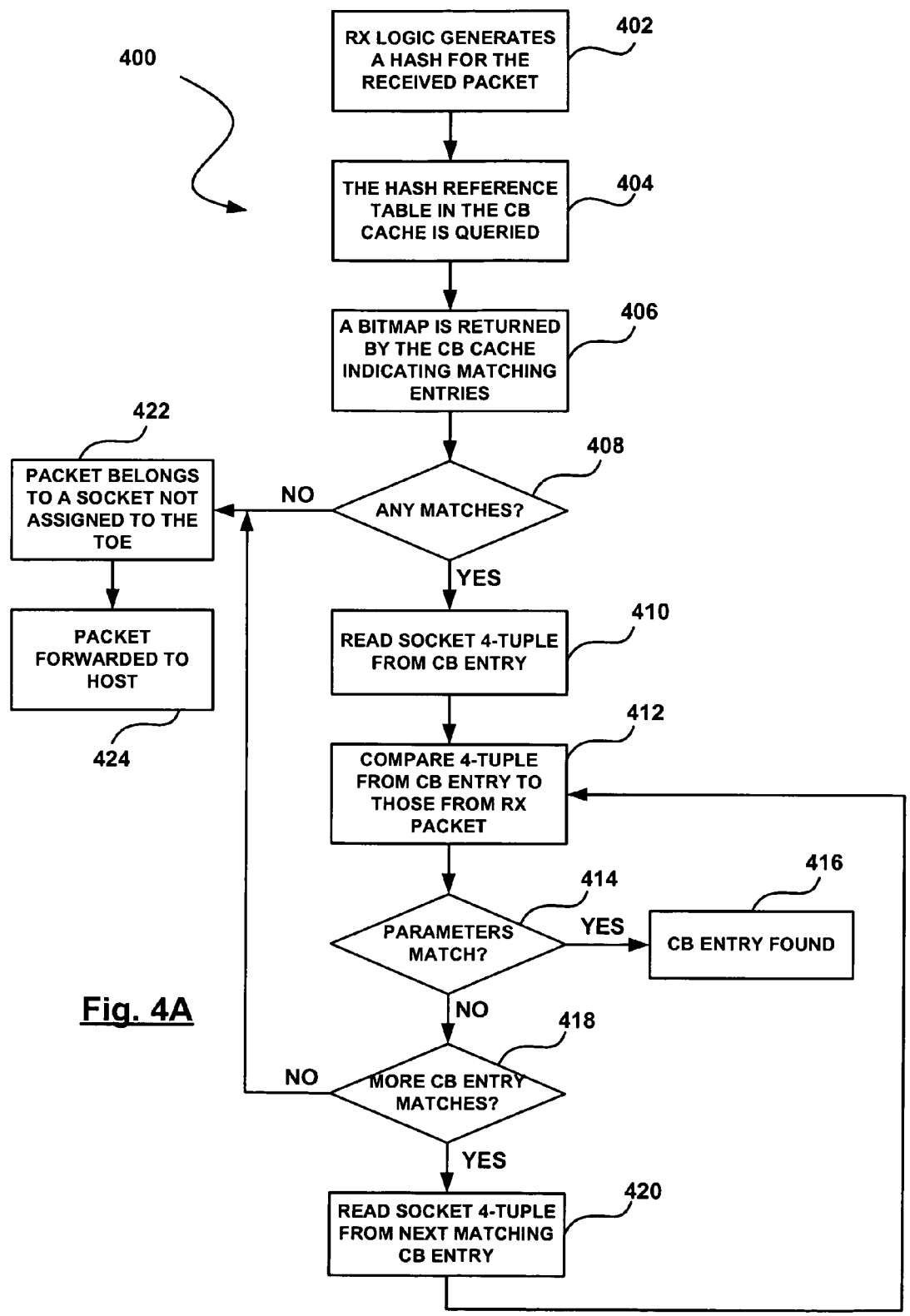
FIG. 4A is a flowchart that illustrates locating a CB entry in the CB cache using a hash reference table when no external CB memory is present according to an embodiment of the invention.
Figure 4B:
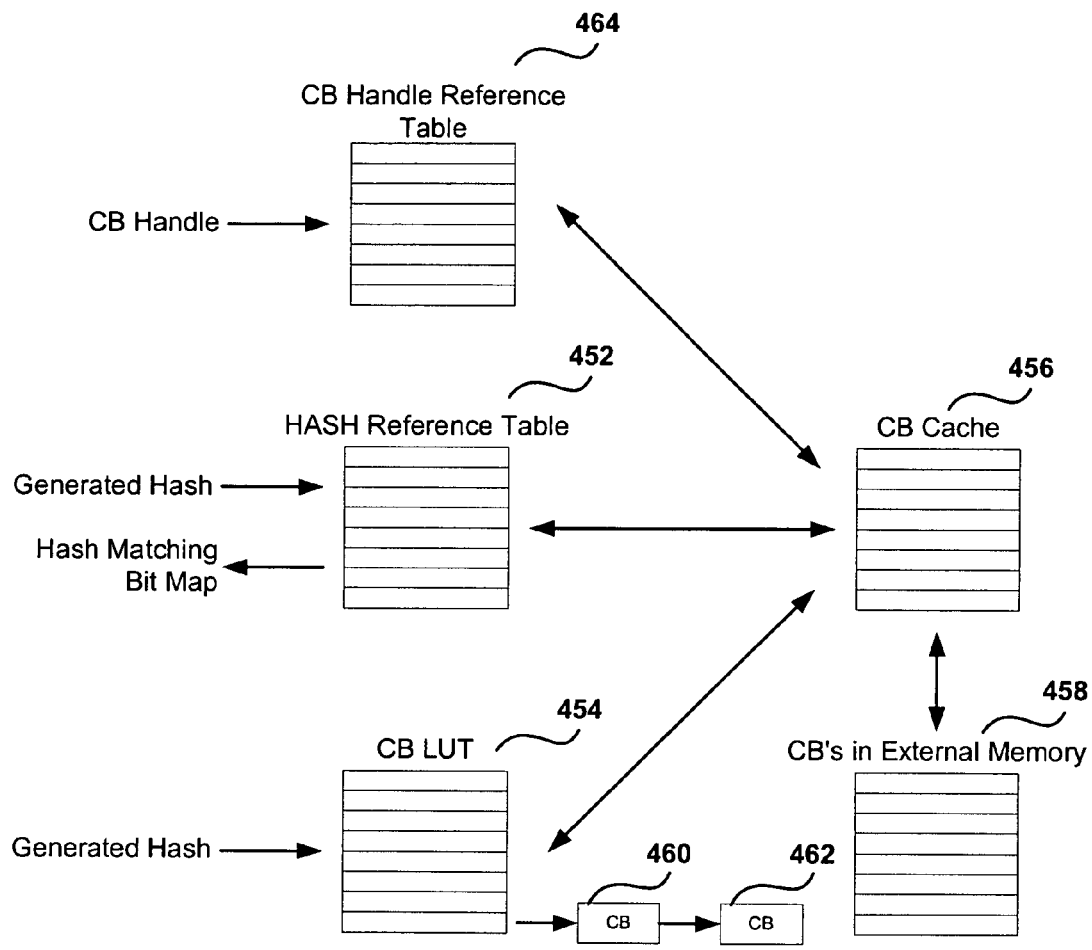
FIG. 4B is a block diagram that illustrates the use of a hash reference table and a CB look up table (LUT) according to an embodiment of the invention.

FIGS. 4A and 4B illustrate an embodiment where CB entries are located in the CB cache using a hash reference table when no external memory is present. The hash reference table is needed because when a network packet is received, the RX logic does not yet know the CB handle for the socket, or whether the packet is associated with a socket assigned to the TOE. If a CB entry is found that contains the same socket parameters (IP addresses and port numbers) as the received packet, then the packet is processed by the TOE. If no matching CB entry is found, then the packet is forwarded to the host for processing.

The TOE's RX logic first generates a hash value for each received network packet as indicated in operation 402. The hash is based on the four-tuple parameters of the packet (the local and remote IP addresses, and the local and remote ports). The received network packet hash value is then compared to the hash values in the hash reference table (452) in operation 404. The CB Cache controller will then return a bitmap indicating which slots (if any) in the CB Cache (456) have matching hash values. See operation 406. A check is then made in decision 408 to see if any of the CB entries in the CB cache have hashes that match that of the received network packet. If there are no matches and since external memory is not present, then the TOE has not been assigned the received network packet's socket. See operation 422. The packet is then forwarded to the host for processing in operation 424. If there are matches, then the RX logic will then read the IP addresses and port numbers from the first matching CB entry in the cache to see if they match those of the received network packet. See operation 410 and 412. If they do match, then the correct CB entry has been found. See decision 414 and operation 416. If the parameters do not match, then a check is made to see if there are more matching CB entries in the CB cache. See decision 418. If there are more entries, then the next set of socket parameters is read in operation 420, and compared against those of the received network packet in operation 412. If there are no more matching entries, and the correct CB entry has not yet been found, then the packet does not belong to a socket that has been assigned to the TOE (operation 422), and the packet is again forwarded to the CPU for processing. See operation 424.

Figure 5:
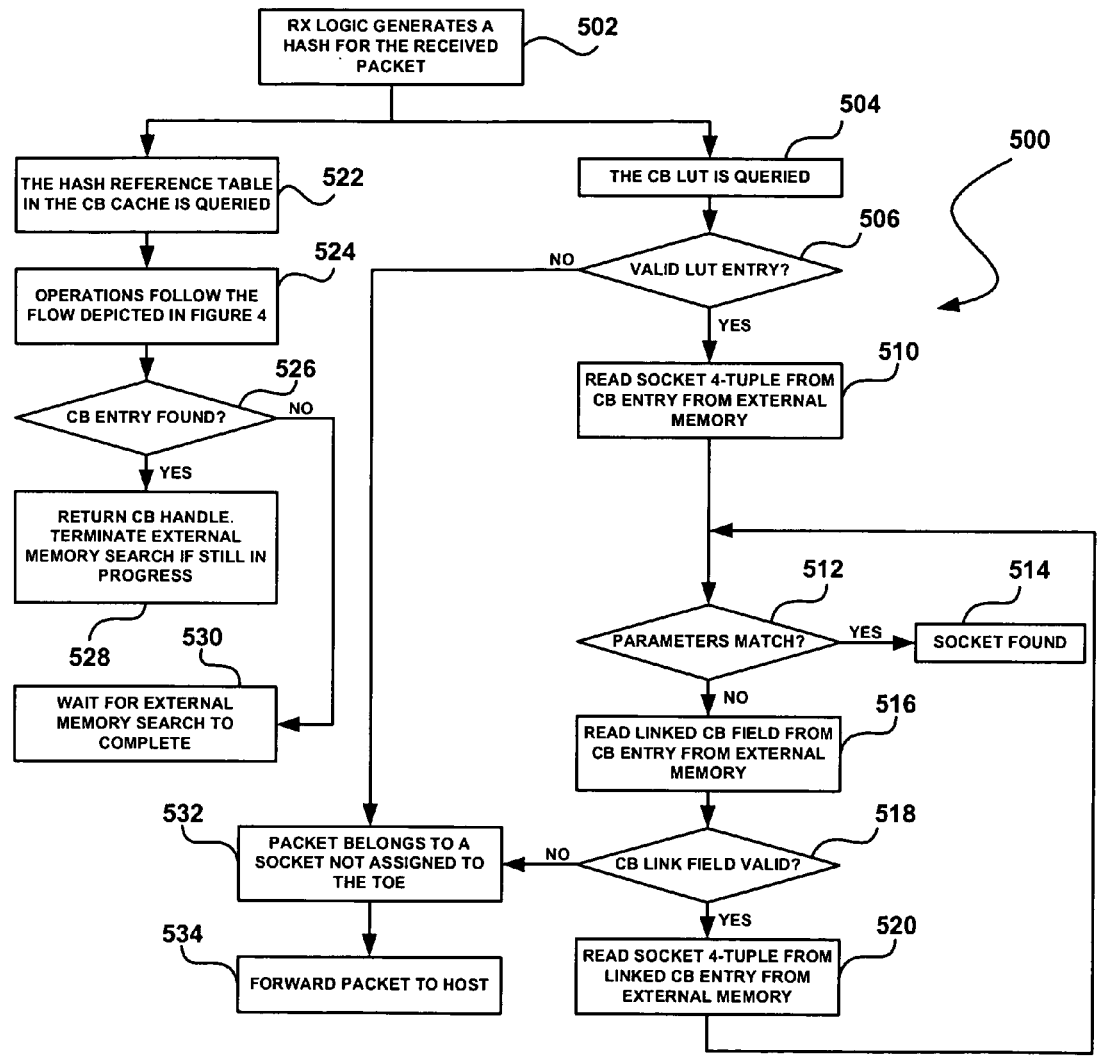
FIG. 5 is a flowchart that illustrates locating a CB entry in the CB cache using a hash reference table when external CB memory is present according to an embodiment of the invention.

FIG. 5 depicts an embodiment that locates CB's when external memory is present. The RX logic begins by again generating a hash for the received network packet in operation 502. It will then simultaneously query the CB Cache controller's Hash reference table (452) (operation 522) as well as a CB look up table (LUT) (454) (operation 504). The CB LUT (454) uses the hash generated from the received network packet as an address into the LUT and returns a valid indicator and a CB handle (460). If the CB LUT returns a valid indicator (see decision 506), then the socket 4-tuple is read from the CB entry indicated by the CB LUT in operation 510. If the parameters match (see decision 512), then the CB has been found (see operation 514). Hash values are not guaranteed to be unique across all sockets assigned to the TOE. To handle the case of hash collisions (i.e. two or more sockets have the same generated hash value), a field is provided in the CB entry that points to the next CB handle that has the same hash value. This is referred to as the Linked CB handle. If the parameters did not match in decision 512, then the linked CB field is read from the CB entry in operation 516. If the CB field is not valid (see decision 518), it again means that the packet is associated with a socket not assigned to the TOE (see operations 532 and 534). If the linked CB field is valid, then the socket 4-tuple is read from the linked CB entry (462). See operation 520. The parameters are then again checked to see if they match the parameters from the received network packet. See decision 512. This continues until the CB is found or a CB's linked field is not valid.

This CB look up in external memory and the CB cache via the CB LUT is done in parallel to querying the CB Cache via the HASH reference table. If the query to the CB cache (see operation 524) completes and the CB entry is found to be in the cache (see decision 526), then the search for the CB via the CB LUT is terminated (see operation 528). It is therefore obvious that the CB Cache and CB location method outlined above provides a much quicker method for determining if a received packet is associated with a socket assigned to the TOE. If the CB entry is not found, then the process waits for the results of the CB LUT search (see operation 530).

If the CB LUT query in operation 504 does not return a valid LUT entry, than it also means that the packet is associated with a CB not assigned to the TOE (see operation 532). In this case, the packet is also forwarded to the host for further processing (see operation 534).

2.23 CB Entry Lookup Using CB Handles

Figure 6:
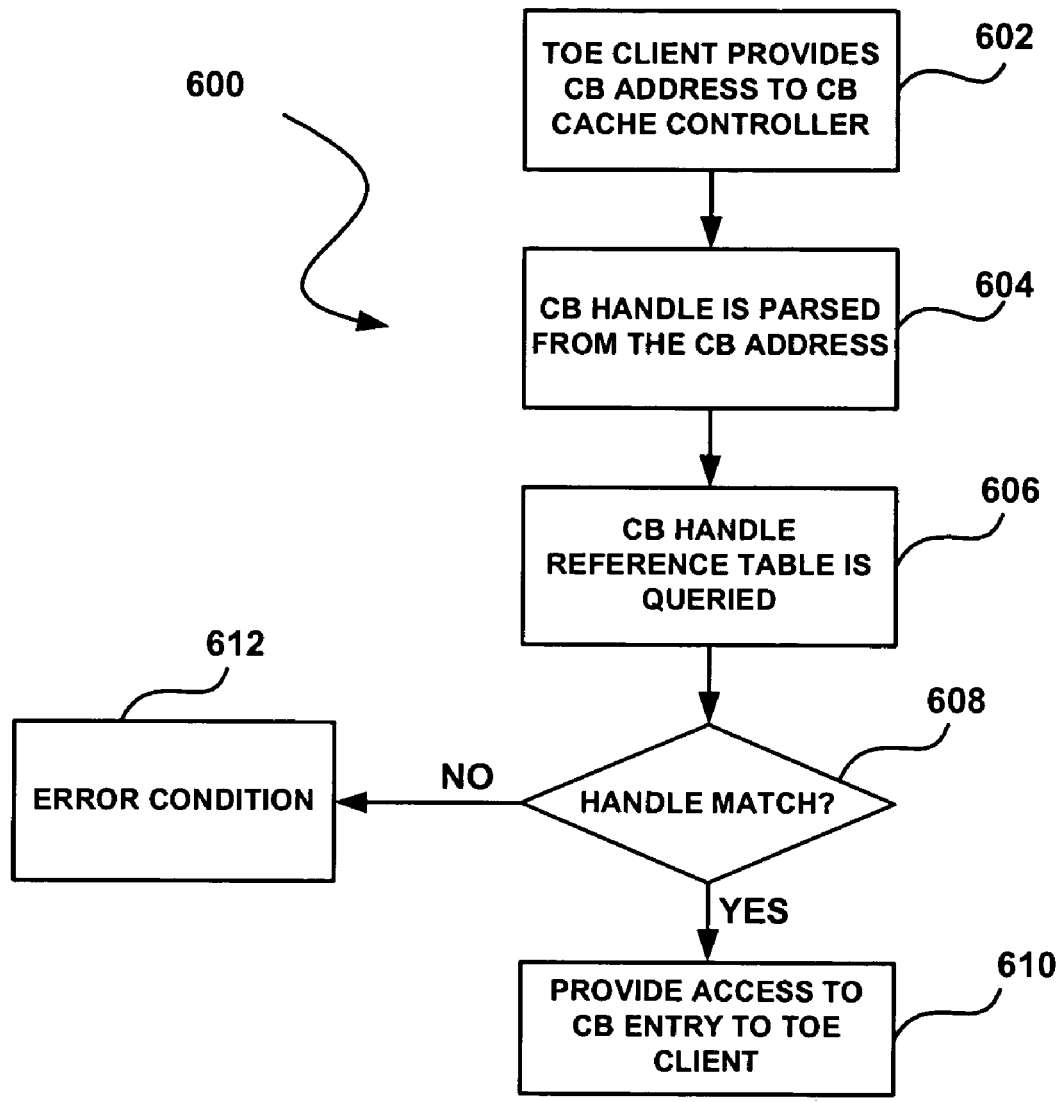
FIG. 6 is a flowchart that illustrates locating a CB entry in the CB cache using a CB handle reference table when no external memory is present according to an embodiment of the invention.

FIG. 6 illustrates one embodiment where CB entries are located in the CB cache using a CB handle reference table (464) when no external memory is present. This method of CB access is used by clients that already know the CB handle they wish to access. An example of this type of client is the TX data packet generator. The module will get a request from the host to transmit data on a given socket, and the CB handle associated with the socket is passed to the TX data packet generator as part of the transmit request.

For these accesses, the TOE client begins by providing a CB address to the CB Cache controller (see operation 602). The address is comprised of the CB handle concatenated with a CB offset. For example, if each CB entry is made up of 64 double word fields, then the CB offset is 6 bits long. If the CB handle is 16 bits long (thus allowing for 64K CB's), then if a client wanted to access the second DWORD in a CB entry with handle 0x1005, the address calculation is:

CB Address={CH_Handle, CB_Offset}={16'h1005, 6'h02}=22'h040142

The TOE client begins the request by providing the CB address to the CB Cache controller in operation 602. The CB Cache controller then parses out the CB handle from the supplied address in operation 604. Using the above example, the CB handle is obtained by parsing bits[21:6] of the CB address. The CB Cache controller then queries the CB Handle reference table (464) to find which CB cache slot (456) contains the CB handle requested. See operation 606. If no matching CB handle is found in the reference table (per decision 608), then an error condition (612) is reported back to the host as it has referenced a socket that is not assigned to the TOE. Normally, the CB Handle reference table will return a CB slot where the CB entry is located, at which point the CB Cache controller can grant the TOE clients access request to the CB. See operation 610.

Figure 7:
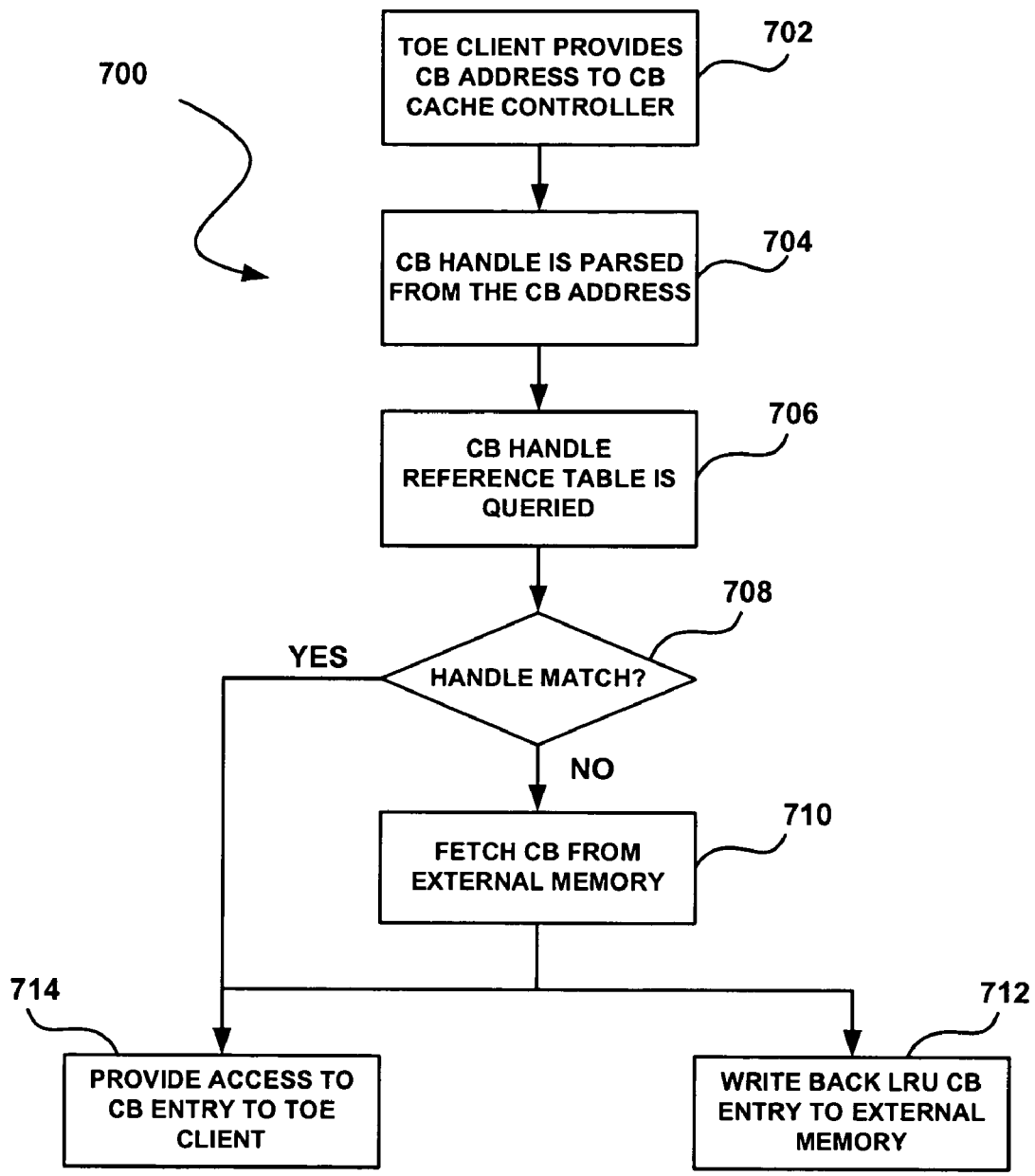
FIG. 7 is a flowchart that illustrates locating a CB entry in the CB cache using a CB handle reference table when external memory is present according to an embodiment of the invention.

FIG. 7 illustrates an embodiment where CB entries are located in the CB cache when external memory is present in the TOE system. In this case, the TOE client again begins by providing a CB address to the CB Cache controller. See operation 702. The CB Cache controller parses out the address in operation 704 in the same manner as outlined above. The CB Handle is then compared to entries in the CB Handle reference table (464). See operation 706. Then, depending on whether the CB handle matched any entries in the reference table (see decision 708), the TOE Client is either granted access to the CB (see operation 714) or the CB is fetched from external memory (458). See operation 710. After the CB is fetched, the TOE client is given access to the CB in operation 714, and in parallel, the least recently used (LRU) CB entry is written back to external memory. See operation 712.

As noted above, and in FIG. 3, in one embodiment, the CB cache 301 has space for 16 complete CBs. In this embodiment, all 16 spaces are used for CB entries when the external SRAM is not present. Any CB entries not in the CB cache 301 are sent to the host for the host to handle.

When the external SRAM 306 is present, a method is implemented that allows CB entries from the external SRAM 306 to be written to the CB cache 301 as soon as possible. In this method, of the 16 spaces in the CB cache 301, 15 are utilized at any given time. If the CB entry is in the CB cache 301, then the TOE client request can be serviced directly. The last or $16^{th}$ slot is saved for the case where a new CB entry needs to be fetched from the external SRAM 306. The new CB entry can be fetched first (see operation 710) with the TOE client being serviced immediately (see operation 714). Then, using a separate background process or thread, the least recently used CB entry is written from the CB cache 301 to the external SRAM 306 (see operation 712).

In addition, by knowing a client's access pattern (which is predetermined by the client), the WORD accessing order by the CB cache 301 is tailored such that the client can start reading the CB entry from the CB cache 301 while other parts of the CB entry are still being fetched from the external SRAM 306. After the CB entry has been completely fetched, the least recently used CB entry is written from the CB cache 301 to the external SRAM 306.

In parallel to detecting if the requested CB entry is in the CB cache 301, another look up is performed in order to determine if the field in the CB entry being requested is currently free for access or whether it is locked by another resource. A resource may need to lock a CB field if it is doing a read-modify-write operation. To detect this condition, the CB cache address being requested is sent to a sub-module which keeps track of which fields are locked. In the sub-module, the address is compared to see if any other resource is currently locking the field. If no resources are locking the particular CB field, then the access cycle is allowed to proceed.

This CB field locking feature supports providing the maximum bandwidth to the CB cache 301 while still maintaining CB content coherency. If entire CB entries were locked out until a client was finished using them, then too many clients would spend too much time waiting for CB entry accesses. Likewise, if a locking mechanism is not provided, then it is possible for multiple clients to access the same field within a CB entry and CB content integrity would be compromised.

2.24 CB Cache Organization

The CB cache uses a least recently used algorithm for determining which CB is written back to external SRAM when a new CB needs to be fetched from external SRAM. To implement this, the CB cache controller maintains a list of the CB's and orders them according to accesses.

In an embodiment with 16 entries in the CB cache, after any reset, the list is established in the following order:

| | |
|---|---|
| 0 | CB Slot0 (oldest) |
| 1 | CB Slot1 |
| 2 | CB Slot2 |
| 3 | CB Slot3 |
| 4 | CB Slot4 |
| 5 | CB Slot5 |
| 6 | CB Slot6 |
| 7 | CB Slot7 |
| 8 | CB Slot8 |
| 9 | CB Slot9 |
| 10 | CB Slot10 |
| 11 | CB Slot11 |
| 12 | CB Slot12 |
| 13 | CB Slot13 |
| 14 | CB Slot14 |
| 15 | CB Slot15 |

When the first CB entry is accessed, it will go into slot 0. At that time, CB Slot 0 is moved to the bottom of the list, and all other entries will move up one slot. The list will appear as follows:

| | |
|---|---|
| 0 | CB Slot1 |
| 1 | CB Slot2 |
| 2 | CB Slot3 |
| 3 | CB Slot4 |
| 4 | CB Slot5 |
| 5 | CB Slot6 |
| 6 | CB Slot7 |
| 7 | CB Slot8 |
| 8 | CB Slot9 |
| 9 | CB Slot10 |
| 10 | CB Slot11 |
| 11 | CB Slot12 |
| 12 | CB Slot13 |
| 13 | CB Slot14 |
| 14 | CB Slot15 |
| 15 | CB Slot0 |

After 16 or more CB's are allocated, then the cache is full. At that time the list may have a random order depending on which CB's were accessed in what order. One entry is always kept open however. This is to allow a new entry to be read first thereby allowing quicker access to the new CB. After the new CB is read, then the LRU CB is written back to external memory. A sample list is shown below:

| | |
|---|---|
| 0 | CB Slot2 (Empty) |
| 1 | CB Slot3 (oldest) |
| 2 | GB Slot6 |
| 3 | GB Slot8 |
| 4 | CB Slot10 |
| 5 | CB Slot1 |
| 6 | CB Slot15 |
| 7 | CB Slot4 |
| 8 | CB Slot5 |
| 9 | CB Slot12 |
| 10 | CB Slot11 |
| 11 | CB Slot13 |
| 12 | CB Slot0 |
| 13 | CB Slot14 |
| 14 | CB Slot7 |
| 15 | CB Slot9 |

If at this time, CB Entry 4 (currently in the 7$^{th}$ position in the above list) is accessed, then it will move to the bottom of the list, and the list will now appear as shown below:

| | |
|---|---|
| 0 | CB Slot2 (Empty) |
| 1 | CB Slot3 |
| 2 | CB Slot6 |
| 3 | CB Slot8 |
| 4 | CB Slot10 |
| 5 | CB Slot1 |
| 6 | CB Slot15 |
| 7 | CB Slot5 |
| 8 | CB Slot12 |
| 9 | CB Slot11 |
| 10 | CB Slot13 |
| 11 | CB Slot0 |
| 12 | CB Slot14 |
| 13 | CB Slot7 |
| 14 | CB Slot9 |
| 15 | CB Slot4 |

Next, if CB entry 8 is deprecated, it is moved up to the top of the list, and the list will now appear as shown below:

| | |
|---|---|
| 0 | CB Slot 8 (Empty) |
| 1 | CB Slot 2 (Empty) |
| 2 | CB Slot 3 |
| 3 | CB Slot 6 |
| 4 | CB Slot 10 |
| 5 | CB Slot 1 |
| 6 | CB Slot 15 |
| 7 | CB Slot 5 |
| 8 | CB Slot 12 |
| 9 | CB Slot 11 |
| 10 | CB Slot 13 |
| 11 | CB Slot 0 |
| 12 | CB Slot 14 |
| 13 | CB Slot 7 |
| 14 | CB Slot 9 |
| 15 | CB Slot 4 |

If a CB update request is made, then the oldest CB entry (in this case Entry 8 from the above table) is moved down to the bottom of the list. The list would then appear as follows:

| | |
|---|---|
| 0 | CB Slot 2 (Empty) |
| 1 | CB Slot 3 |
| 2 | CB Slot 6 |
| 3 | CB Slot 10 |
| 4 | CB Slot 1 |
| 5 | CB Slot 15 |
| 6 | CB Slot 5 |
| 7 | CB Slot 12 |
| 8 | CB Slot 11 |
| 9 | CB Slot 13 |
| 10 | CB Slot 0 |
| 11 | CB Slot 14 |
| 12 | CB Slot 7 |
| 13 | CB Slot 9 |
| 14 | CB Slot 4 |
| 15 | CB Slot 8 |

3.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of accessing and maintaining socket control information for high speed network connections, the method comprising the steps of:
    storing socket control information in a control block (CB) cache in a transport offload engine (TOE);
    wherein CB entries in the CB cache are comprised of socket control information for sockets assigned to the TOE by a host computer;
    wherein the CB cache is a multi-port device providing direct access to the CB cache via each port;
    wherein a first port is dedicated to transmit logic within the TOE;
    wherein a second port is dedicated to receive logic within the TOE; and
    wherein at least one of the first port and the second port is dedicated to time critical TOE clients.

2. A method as recited in claim 1, further comprising the step of:
dedicating a port to an optional memory;
wherein the optional memory stores the CB entries that are directly accessible by the CB cache via the port; and
wherein the optional memory also serves as main memory for the TOE.

3. A method as recited in claim 2, wherein one entry in the CB cache is kept empty to facilitate reading a CB entry from the optional memory before writing the CB entry into the optional memory.

4. A method as recited in claim 1, further comprising the step of:
dedicating a port for host transfers of the CB entries.

5. A method as recited in claim 1, wherein the CB entries are read from the CB cache in a word order that is dependent upon a port's purpose.

6. A method as recited in claim 1, further comprising the step of:
dedicating a port to low demand TOE clients; and
wherein the low demand TOE clients are granted access to the port based on a priority.

7. A method as recited in claim 1, further comprising the step of:
providing field locking means for locking a specific field within a CB entry that is being accessed by a port;
wherein the locking means prevents other ports from accessing a locked field.

8. A method as recited in claim 1, further comprising the steps of:
providing a hash reference table;
wherein the hash reference table is comprised of hash values corresponding to each CB entry in the CB cache;
creating a hash value for a received network packet;
comparing the received network packet hash value with the hash values in the hash reference table; and
searching for a corresponding CB entry in the CB cache via a port if the network packet hash value matches the hash value in the hash reference table.

9. A method as recited in claim 1, further comprising the steps of:
providing a CB identifier reference table;
wherein the CB identifier reference table is comprised of a unique CB identifier corresponding to each CB entry in the CB cache and an associated CB cache index;
creating a CB identifier by parsing out the CB identifier from a CB access address;
comparing the CB identifier with CB identifier values in the CB identifier reference table;
accessing the CB cache via a port using the CB cache index of a matching CB identifier value in the CB identifier reference table; and
wherein if the CB identifier does not match the CB identifier value in the CB identifier reference table, then a corresponding socket has either not been assigned to the TOE or the CB entry must be brought into the CB cache from an optional memory.

10. A method as recited in claim 2, further comprising the steps of:
providing a CB identifier reference table;
wherein the CB identifier reference table is comprised of a unique CB identifier corresponding to a CB entry for each socket assigned to the TOE and an associated CB cache index;
creating a CB identifier for a CB access by parsing out the CB identifier from a CB access address;
comparing the CB identifier with CB identifier values in the CB identifier reference table;
accessing the CB cache via the port using the CB cache index of a matching CB identifier value in the CB identifier reference table;
wherein if the CB identifier does not match the CB identifier value in the CB identifier reference table, then the CB entry is not in the CB cache; and
providing means for retrieving a corresponding CB entry from the optional memory and placing the retrieved CB entry in the CB cache, if the CB cache index of the matching CB identifier value indicates that the CB entry is not in the CB cache.

11. An apparatus for accessing and maintaining socket control information for high speed network connections, comprising:
a mechanism for storing socket control information in a control block (CB) cache in a transport offload engine (TOE);
wherein CB entries in the CB cache are comprised of socket control information for sockets assigned to the TOE by a host computer;
wherein the CB cache is a multi-port device providing direct access to the CB cache via each port;
wherein a first port is dedicated to transmit logic within the TOE;
wherein a second port is dedicated to receive logic within the TOE; and
a mechanism for dedicating at least one of the first port and/or the second port to time critical TOE clients.

12. An apparatus as recited in claim 11, further comprising:
a mechanism for dedicating a port to an optional memory;
wherein the optional memory stores the CB entries that are directly accessible by the CB cache via the port; and
wherein the optional memory also serves as main memory for the TOE.

13. An apparatus as recited in claim 12, wherein one entry in the CB cache is kept empty to facilitate reading a CB entry from the optional memory before writing the CB entry into the optional memory.

14. An apparatus as recited in claim 11, further comprising:
a mechanism for dedicating a port for host transfers of the CB entries.

15. An apparatus as recited in claim 11, wherein the CB entries are read from the CB cache in a word order that is dependent upon a port's purpose.

16. An apparatus as recited in claim 11, further comprising:
a mechanism for dedicating a port to low demand TOE clients; and
wherein the low demand TOE clients are granted access to the port based on a priority.

17. An apparatus as recited in claim 11, further comprising:
field locking means for locking a specific field within a CB entry that is being accessed by a port;
wherein the locking means prevents other ports from accessing a locked field.

18. An apparatus as recited in claim 11, further comprising:
a hash reference table;
wherein the hash reference table is comprised of hash values corresponding to each CB entry in the CB cache;
a mechanism for creating a hash value for a received network packet;
a mechanism for comparing the received network packet hash value with the hash values in the hash reference table; and a mechanism for searching for a corresponding CB entry in the CB cache via a port if the network packet hash value matches the hash value in the hash reference table.

19. An apparatus as recited in claim 11, further comprising:
a CB identifier reference table;
wherein the CB identifier reference table is comprised of a unique CB identifier corresponding to each CB entry in the CB cache and an associated CB cache index;
a mechanism for creating a CB identifier by parsing out the CB identifier from a CB access address;
a mechanism for comparing the CB identifier with CB identifier values in the CB identifier reference table;
a mechanism for accessing the CB cache via a port using the CB cache index of a matching CB identifier value in the CB identifier reference table; and
wherein if the CB identifier does not match the CB identifier value in the CB identifier reference table, then a corresponding socket has either not been assigned to the TOE or the CB entry must be brought into the CB cache from an optional memory.

20. An apparatus as recited in claim 12, further comprising:
a CB identifier reference table;
wherein the CB identifier reference table is comprised of a unique CB identifier corresponding to a CB entry for each socket assigned to the TOE and an associated CB cache index;
a mechanism for creating a CB identifier for a CB access by parsing out the CB identifier from a CB access address;
a mechanism for comparing the CB identifier with CB identifier values in the CB identifier reference table;
a mechanism for accessing the CB cache via the port using the CB cache index of a matching CB identifier value in the CB identifier reference table;
wherein if the CB identifier does not match the CB identifier value in the CB identifier reference table, then the CB entry is not in the CB cache; and
means for retrieving a corresponding CB entry from the optional memory and placing the retrieved CB entry in the CB cache, if the CB cache index of the matching CB identifier value indicates that the CB entry is not in the CB cache.

21. An apparatus for accessing and maintaining socket control information for high speed network connections, comprising:
a multi-port SRAM control block (CB) cache in a transport offload engine (TOE);
wherein CB entries in the CB cache are comprised of socket configuration information for sockets assigned to the TOE by a host computer;
wherein the CB cache provides TOE clients direct access to the CB cache via each port;
wherein a first port is dedicated to transmit logic within the TOE;
wherein a second port is dedicated to receive logic within the TOE; and
a mechanism for dedicating at least one of the first port and the second port to time critical TOE clients.

22. An apparatus as recited in claim 21, further comprising:
a mechanism for arbitrating access between TOE clients sharing a common port in a multi-port device based on a priority; and
wherein time critical TOE clients are assigned a higher priority.

23. An apparatus as recited in claim 21, further comprising:
a mechanism for dedicating a port to low demand TOE clients; and
wherein the low demand TOE clients are granted access to the port based on a priority.

\* \* \* \* \*